United States Patent [19]

Amann

[11] Patent Number: 4,871,600
[45] Date of Patent: Oct. 3, 1989

[54] BREATHABLE LAMINATE FABRIC

[75] Inventor: John Amann, 19 Alameda Pl., Mount Vernon, N.Y. 10552

[73] Assignee: John Amann, Mount Vernon, N.Y.

[21] Appl. No.: 171,661

[22] Filed: Mar. 22, 1988

[51] Int. Cl.⁴ .............................................. B32B 3/14
[52] U.S. Cl. ........................................ 428/56; 428/58;
428/179; 428/190; 428/198; 428/286; 428/288;
428/294
[58] Field of Search ...................... 428/56, 58, 77, 174,
428/179, 190, 198, 284, 286, 288, 294

[56] References Cited

U.S. PATENT DOCUMENTS 271,086  1/1883  Loeb ..................................... 428/56
1,820,047  8/1931  Burkart ............................... 428/56

Primary Examiner—Marion C. McCamish
Attorney, Agent, or Firm—Thomas A. Beck

[57] ABSTRACT

A breathable, laminate fabric which is impervious to water, aqueous solutions and organic solvents comprising a base layer formed from a porous, absorbent material which is bonded at spaced points to a second layer comprised of a series of parallel strips, impervious to water, aqueous solutions and organic liquids, said straips being disposed transversely to the edges of said underlying base layer, said strips having leading and trailing edges, and extending longitudually along said base layer in an overlapping manner such that the leading edge of one strip overlaps the trailing edge of the next succeeding strip in the series, said base layer or said second layer being comprised of a thermoplastic material.

12 Claims, 3 Drawing Sheets

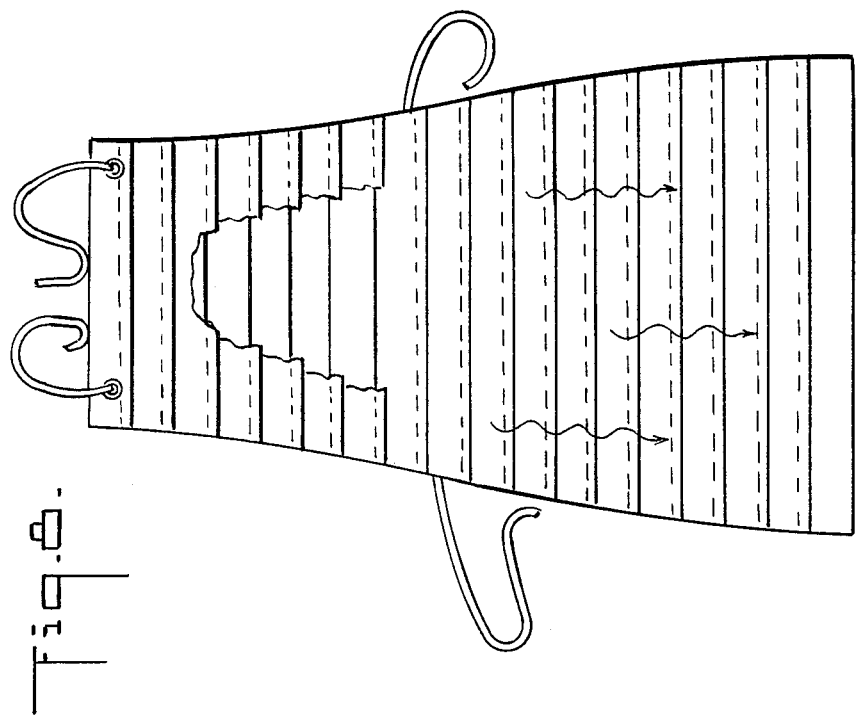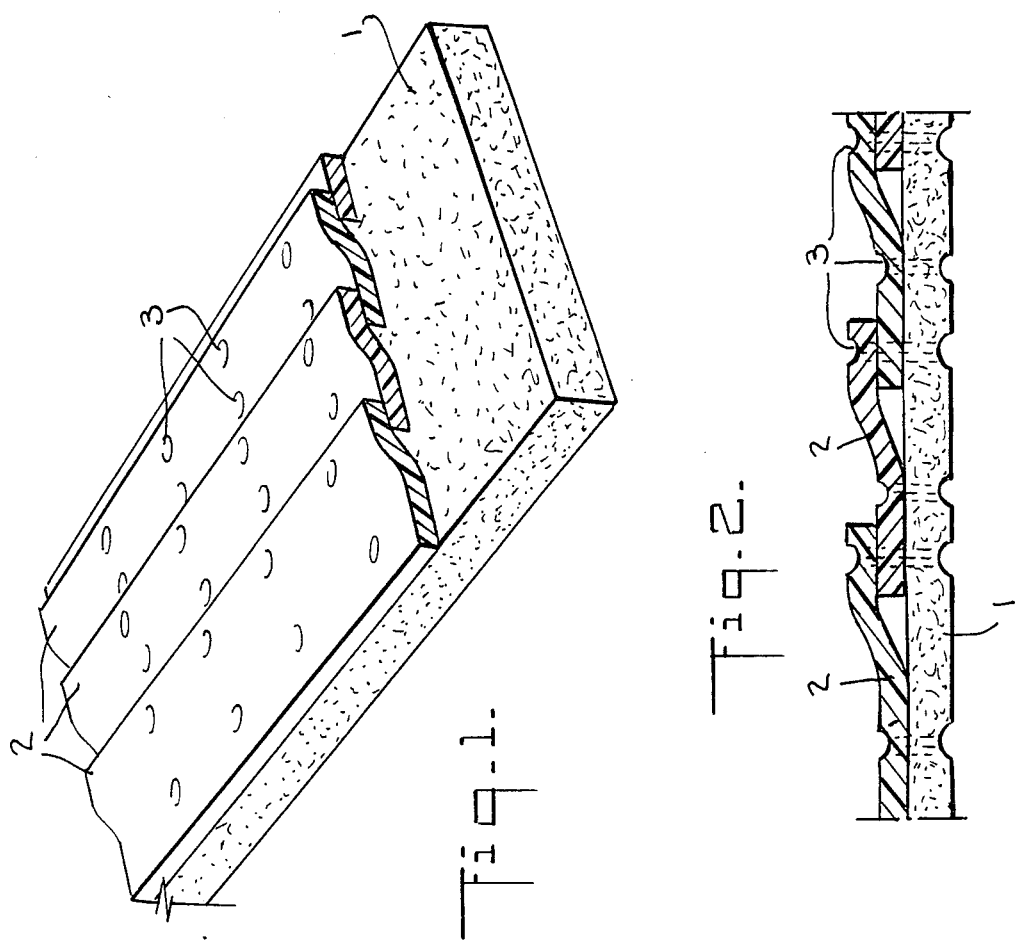

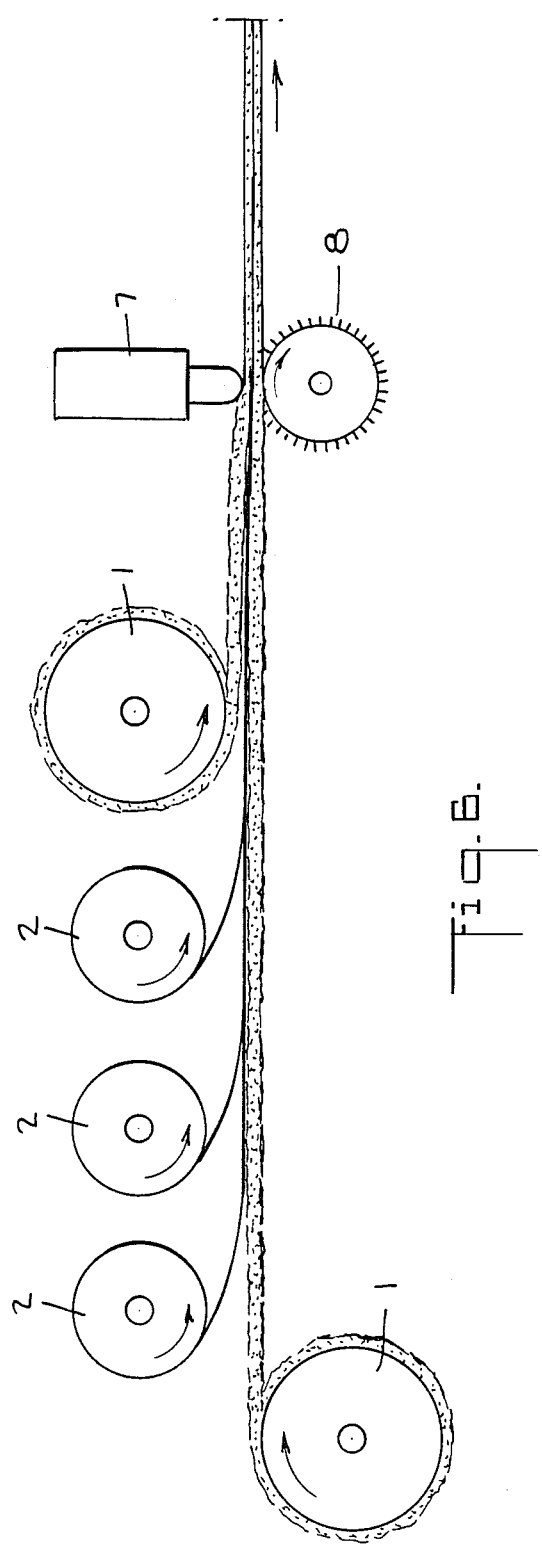
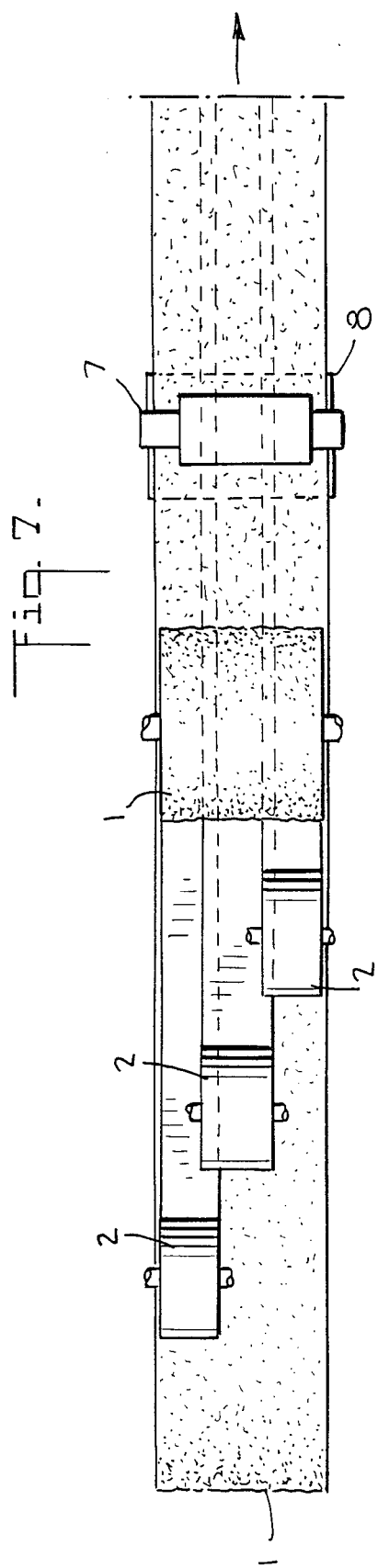

BREATHABLE LAMINATE FABRIC

BACKGROUND OF THE INVENTION

The present invention relates to a breathable laminate fabric which is impervious to aqueous and organic liquids. The aforementioned fabric comprises a base layer formed from a porous absorbent material which is bonded at spaced points to a second layer composed of a series of parallel strips, impervious to aqueous or organic liquids, said strips being disposed transversely to the edges of the underlying base layer and having leading and trailing edges, extending longitudinally along said base layer in an overlapping manner such that the leading edge of one strip overlaps the trailing edge of the next succeeding strip of the series.

Optionally, a third layer may be bonded at spaced points to said second layer, thereby covering over the overlapping strips comprising said second layer. In the situation where the laminate fabric of the present invention comprises three layers, the first and second layers, the first and third layers, the second and third layers or the second layer alone are comprised of a thermoplastic material.

Regardless of whether there are two or three layers comprising the laminate fabric of the present invention, and regardless of whether the aforementioned layers are formed from thermoplastic or thermosetting materials, it is an essential requirement that the material comprising the second layer be impervious to water, aqueous and organic liquids.

Chemically treated woven and nonwoven fabrics used to repel aqueous or organic liquids are widely known. In addition to the expense involved in the chemical treatment of fabrics, a major problem is that many chemically treated fabrics are not breathable, so that when it is used in some form as a protective garment, it is uncomfortable for the wearer. Woven fabrics suffer from the same defect in that in order to make it a waterproof or an organic solvent proof material, the knit must be extremely tight so that the water cannot penetrate or permeate the interstices present in the woven fabric.

OBJECT OF THE INVENTION

Accordingly, it is a principal object of the present invention to provide a laminate fabric which when fabricated into a garment provides a more than satisfactory comfort level to the wearer, since the perspiration generated during the course of wearing the article is absorbed and dissipated through the fabric with the result that the body remains essentially dry and comfortable at ambient temperature.

An additional object of the present invention is to provide an efficient and economical method of preparing a laminate fabric containing the above-mentioned characteristics.

Other objects and advantages of the present invention will become apparent upon reading the following detailed description and upon reference to the drawings in which:

FIG. 1 is a schematic perspective view of the laminate fabric containing two layers and showing in detail the overlapping strips of the second layer according to the present invention.

FIG. 2 is a cross-sectional view of the laminate fabric shown in FIG. 1.

FIG. 6 is a side view of apparatus which can be used for continuously manufacturing the laminated sheet article shown in FIG. 4 above.

FIG. 7 is a schematic top view of the apparatus used in the method of manufacturing the laminate fabric shown in FIG. 6.

FIG. 8 is a front view of an apron made from the laminate fabric of the present invention showing the overlapping orientation of the strips of the second layer, so that liquid traveling by gravity over the outer surface toward the ground does not penetrate the fabric.

SUMMARY OF THE INVENTION

Briefly stated, the breathable laminate fabric disclosed above, and constructed in accordance with this invention, provides a fabric which is impervious to aqueous and organic liquids and can be manufactured conveniently using a continuous process. The resulting fabric may be used in any application where it is necessary to prevent the liquid, whether water based or organic solvent, from contacting the person of the wearer. The fabric is especially useful when formed into a garment in instances where it is desirable to prevent particulate matter from entering the atmosphere, since any generated particulate matter on the person of the wearer is retained inside the garment. It is also thus used in garments worn in "clean room environments" of the type required in hospital operating rooms, electronic manufacturing and assembly rooms, etc.

DESCRIPTION OF THE PREFERRED EMBODIMENTS

Figure 3:
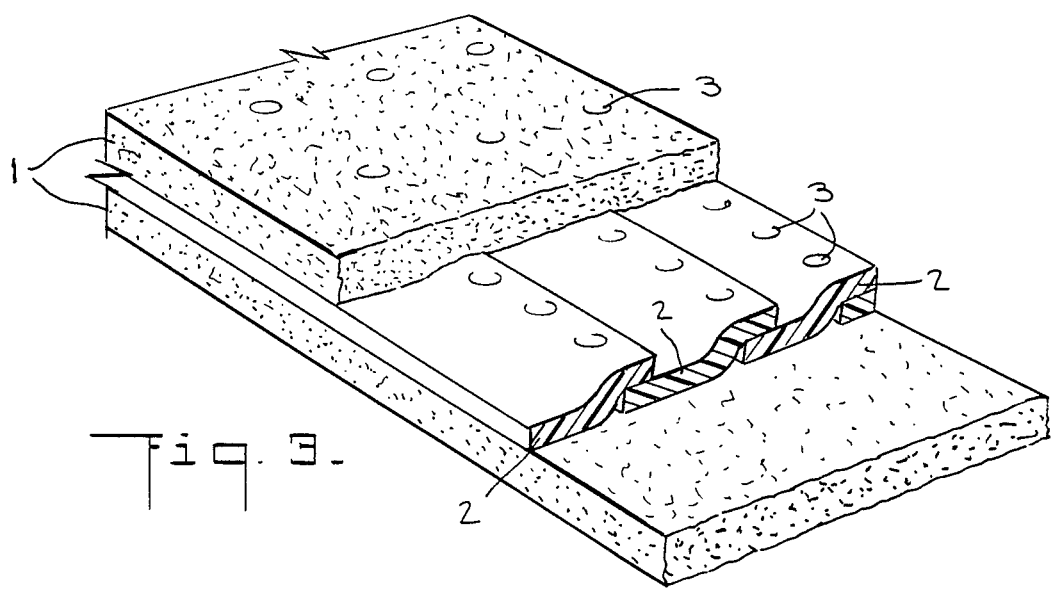
FIG. 3 is a schematic perspective view of the laminate fabric containing three layers and showing in detail the overlapping strips of the second layer according to the present invention.
Figure 4:
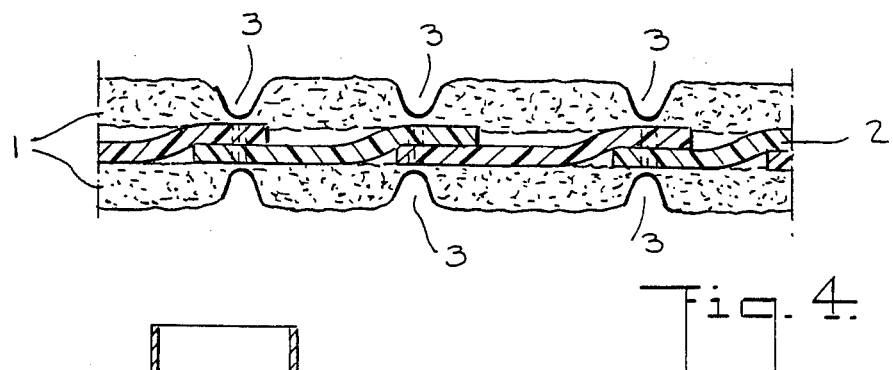
FIG. 4 is a cross-sectional view of the laminate fabric shown in FIG. 3.

In the present invention, layer 1 as shown in FIGS. 1, 3 and 4 is preferably comprised of nonwoven thermally or chemically bonded thermoplastic filaments or fibers in a basis weight range of 10 to 40 grams per square yard, wherein the filaments or fibers have a diameter of from 1 to 8 microns, and preferably less than 4 microns. Said nonwoven layer 1 is characterized by a tensile strength of from 0.5 to about 1.5 pounds per inch of width. Examples of suitable thermoplastic materials used to form layer 1 are polyethylene, polypropylene, nylon and linear polyesters. A nonwoven layer 1, when made to comply with the aforesaid requirements, has the desirable property of absorbing perspiration of the wearer and entrapping free floating particulate matter while retaining breathability, necessary, for example, in clean room garments.

Layer 2, as shown in FIGS. 1, 2, 3 and 4 is preferably comprised of film strips formed from the thermoplastic polymers cited above. However, suitable thermosetting materials may be used effectively as layer 2 (as well as one or more of the other layers comprising the laminate fabric of the present invention) are: crosslinked polyesters, polyamides, polyimides, polytetrafluoroethylene, polyvinyl alcohols, polyvinylchloride and polyacrylics.

In practicing the present invention in its most basic embodiment, i.e., two layers as shown in FIGS. 1 and 2, it is required that at least one of the layers be formed from a thermoplastic material, and, additionally, it is required that the other layer be formed from a material which is impervious to water, aqueous solutions, organic solvents or combinations thereof.

Thus, in selecting the material used as layer 2, it may conveniently be any thermoplastic, thermosetting or treated paper material so long as the material selected is impervious to water, aqueous solutions, organic solvents or combinations thereof at ambient temperature. Accordingly, if layer 2 is formed from a thermoplastic material, layer 1 can be formed from a thermoplastic thermosetting or treated paper material; however, if layer 2 is formed from a thermosetting or treated paper material, layer 1 must be formed from a thermoplastic material.

Another layer of nonwoven web 1 may be positioned in a manner to cover the exposed top of layer 2 with the result that it becomes the exposed top layer of the aforesaid sheet article of FIG. 3. In the embodiment shown in FIGS. 1 and 2, this layer is not utilized, and therefore the third layer is not present.

FIG. 3 shows another embodiment of the invention wherein layer 1' has been placed over layer 2 and bonded at spaced points 3, thereby covering layer 2. The third layer 1' may have characteristics similar to layer 1 and can be formed from a melt blown non-woven fabric or a spun-bonded non-woven fabric using known methods.

Figure 5:
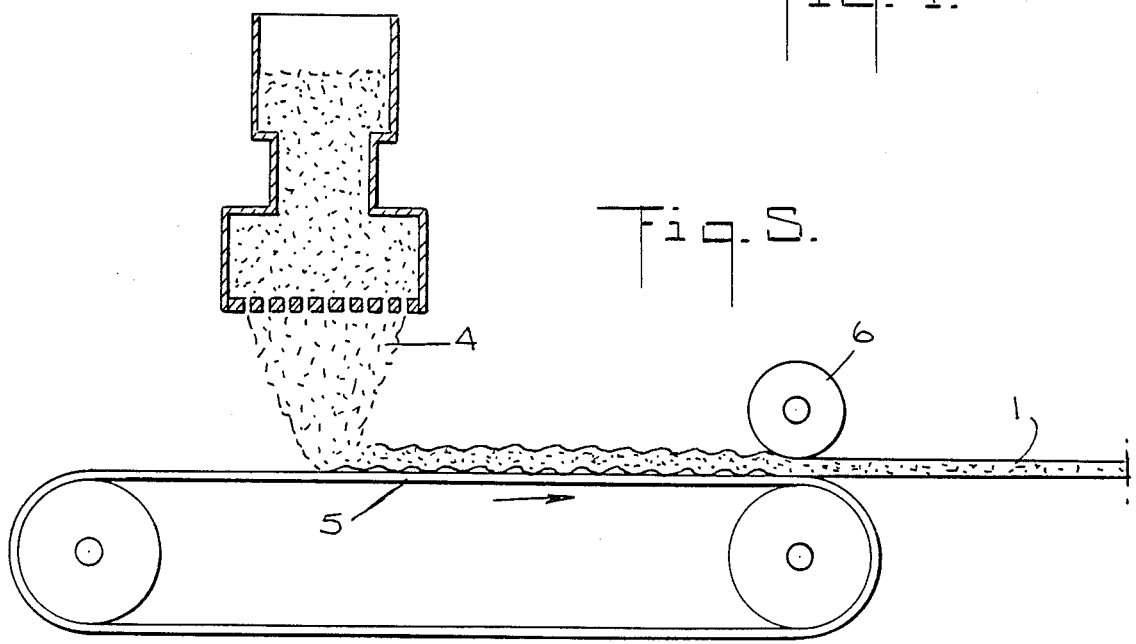
FIG. 5 is a schematic side view of apparatus which can be used in preparing one of the layers of the laminate fabric according to the present invention.

FIG. 5 illustrates one method of manufacturing nonwoven layers 1 and/or 1' which are conveniently used as the base and top layers in the fabric of the present invention. Said nonwoven layer 1 is formed by extruding a melted thermoplastic polymer such as polypropylene, through a plurality of small orifices 4, and blowing the resulting filaments onto a moving belt carrier 5, feeding into a heated compacting roller 6 positioned to compact the aforesaid filaments into a discrete nonwoven web layer, wherein the heated surface of the compacting roll causes adjacent filaments in the web layer to soften and adhesively bond to one another to result in the discrete nonwoven web layer 1. Nonwoven web layer 1 comprised of fibrous thermoplastics may also be made in the aforesaid manner.

FIGS. 6 and 7 illustrate a method for continuously manufacturing the laminate sheet article of FIG. 3. In this method for fabricating a laminate fabric having three layers in accordance with this invention, rolls of nonwoven webs 1 and 1', prepared according to the method shown in FIG. 5 above, are positioned and unwound to form the so-called bottom and top layers 1 and 1' of the aforesaid laminate fabric.

FIGS. 6 and 7 also depict a plurality of narrower rolls of thermoplastic film layers 2, preferably propylene, which are positioned in a staggered and edgewise overlapping manner. As shown in FIGS. 6 and 7, they are unwound to lie in an overlapping manner on top of the aforesaid bottom layer 1, to form the middle layer of the laminate fabric of FIG. 3. The edges of the plurality of film layers 2 are caused to overlap one another by a minimum of one-eighth inch with a maximum of not more than one-half the width of each film strip which comprises layer 2. The requirement here is that the strips which form layer 2 should overlap sufficiently to prevent penetration of the liquid therethrough while the fabric is in use.

Furthermore, sequential staggering of the film strips 2, emanating from the rolls shown in FIGS. 6 and 7, causes the film strips to always overlap in the same manner, that is, with one edge of the film strip 2 overlapping the top of an adjacent film strip 2, and the opposing edge overlapping on the bottom of its adjacent film strip 2.

The aforesaid separate layers 1, 1' and 2 are fed in unison into the nip of the laminating device, comprised of ultrasonic power source 7, and engraved or machined roller 8, wherein all layers are fusibly spot-bonded to each other to result in the laminate fabric of FIG. 3.

The laminating means shown in FIGS. 6 and 7 comprise an ultrasonic source 7 and machined or engraved roll 8 which are positioned in axial alignment, wherein roll 8 is driven by any suitable means to pull the aforesaid layers through the nip formed by ultra sonic power source 7 and roll 8.

Ultrasonic source 7 transmits ultrasonic vibrating energy into the layers 1, 1' and 2, forming the laminate fabric.

Roll 8 is machined or engraved to result in raised surfaces of specific design or patterns, wherein the raised surface area occupies from generally preferably 3% to 50% of the total surface area of the said roll 8; however, lesser surface area may be appropriate under some circumstances.

When layers 1, 1' and 2 are transported under pressure between the said roll 8 and the energy emitting surface of the bar horn of ultrasonic source 7, only the raised or outermost surface of roll 8 is under pressured engagement with the aforementioned layers, and the energy emitting surface of the bar horn of ultrasonic source 7.

Said pressured engagement results in compaction of layers 1, 1' and 2 on the aforesaid surfaces of roll 8.

The compacted areas of those layers of 1, 1' or 2 which are comprised of thermoplastic material, absorb the ultrasonic energy causing their temperatures to rise until they soften or melt, and thereby become fused to form spot bond 3. Upon exiting the nip, the fused areas cool and solidify to form the laminate fabric of FIG. 3.

FIG. 8 illustrates an apron showing the overlapping strips which comprise the fabric. In order to be effective in preventing liquid from contacting the body of the wearer, the strips should overlap in the same fashion as overlapping shingles are fixed to the exterior side of a house. In applications where it is desired to prevent water from penetrating a garment made from a fabric prepared as disclosed above, the overlapping strips should be oriented to preclude a liquid from seeping through the edges of the strips inside the strips.

As disclosed hereinabove, the laminate fabric of the present invention is preferably utilized in fabrication of a garment; however, it should be obvious that the fabric is not limited to such use. The fabric of the present invention can be used in any application where a waterproof breathable fabric is useful provided the orientation of the strips is maintained as described above. Examples of such uses are a protective covering, tent, etc.

I claim:

1. A breathable, laminate fabric which is impervious to water, aqueous solutions and organic solvents comprising a base layer formed from a porous, absorbent material which is bonded at spaced points to a second layer comprised of a series of parallel strips, impervious to water, aqueous solutions and organic liquids, said strips being disposed transversely to the edges of said underlying base layer, said strips having leading and trailing edges, and extending longitudinally along said base layer in an overlapping manner such that the leading edge of one strip overlaps the trailing edge of the next succeeding strip in the series, said base layer or said second layer being comprised of a thermoplastic material.

2. The breathable laminate fabric defined in claim 1 wherein a third layer, substantially identical to said base layer, is bonded at spaced points atop said second layer.

3. The breathable laminate fabric defined in claim 2 wherein said base and third layers are a thermoplastic material and said second layer is a thermosetting material.

4. The breathable laminate fabric defined in claim 2 wherein said base and third layers comprise a thermoplastic material and said second layer comprises treated paper material.

5. The breathable laminate fabric defined in claim 2 wherein said base and third layers comprise a thermosetting material and said second layer comprises a thermoplastic material.

6. The breathable laminate fabric defined in claim 2 wherein said base and second layers are a thermoplastic material and said third layer is a thermosetting material.

7. The breathable laminate fabric defined in claim 2 wherein said base layer is a thermosetting material and said second and third layers are thermoplastic material.

8. The breathable laminate fabric defined in claim 1 wherein all layers comprise polyethylene.

9. The breathable laminate fabric defined in claim 1 wherein all layers comprise polypropylene.

10. The breathable laminate fabric defined in claim 1 wherein said base layer is a thermoplastic material and said second layer is a thermosetting material.

11. The breathable laminate fabric defined in claim 1 wherein said base layer comprises a thermoplastic material and said second layer comprises treated paper material.

12. The breathable laminate fabric defined in claim 1 wherein said base layer comprises a thermosetting material and said second layer comprises a thermoplastic material.

* * * * *